(12) United States Patent
Mullins et al.

(10) Patent No.: US 8,156,736 B2
(45) Date of Patent: Apr. 17, 2012

(54) EXHAUST HYDROCARBON INJECTION CONTROL SYSTEM AND METHOD

(75) Inventors: Jason Daniel Mullins, Brighton, MI (US); Thomas Larose, Jr., Redford, MI (US); James M. Perrin, Livonia, MI (US); Paul Jasinkiewicz, Northville, MI (US)

(73) Assignee: GM Global Technology Operations LLC

( * ) Notice: Subject to any disclaimer, the term of this patent is extended or adjusted under 35 U.S.C. 154(b) by 345 days.

(21) Appl. No.: 12/473,693

(22) Filed: May 28, 2009

(65) Prior Publication Data

US 2010/0300074 A1   Dec. 2, 2010

(51) Int. Cl.
*F01N 3/00* (2006.01)
(52) U.S. Cl. .............................. 60/295; 60/297; 60/276
(58) Field of Classification Search .................. 60/276, 60/299, 311, 295
See application file for complete search history.

(56) References Cited

U.S. PATENT DOCUMENTS

| | | | | |
|---|---|---|---|---|
| 5,564,393 | A * | 10/1996 | Asano et al. | 123/492 |
| 6,079,203 | A * | 6/2000 | Wakamoto | 60/274 |
| 7,735,313 | B2 * | 6/2010 | Osumi et al. | 60/285 |
| 2005/0284134 | A1 * | 12/2005 | Radhamohan et al. | 60/286 |
| 2007/0056264 | A1 * | 3/2007 | Hou et al. | 60/274 |
| 2007/0220866 | A1 * | 9/2007 | Nishiumi | 60/286 |
| 2008/0087739 | A1 * | 4/2008 | Tarabulski et al. | 239/11 |

FOREIGN PATENT DOCUMENTS

| | | | | |
|---|---|---|---|---|
| JP | 2002038939 | A | * | 2/2002 |
| JP | 2007154822 | A | * | 6/2007 |
| JP | 2008095545 | A | * | 4/2008 |

* cited by examiner

*Primary Examiner* — Thomas Denion
*Assistant Examiner* — Patrick Maines

(57) ABSTRACT

A system comprises an injection control module and a fuel film module. The injection control module controls a flow rate of fuel injected into an exhaust system to adjust a temperature of exhaust gas. The fuel film module determines an accumulation rate of fuel on a surface of the exhaust system based on the flow rate of the fuel. The fuel film module determines a release rate of fuel from the surface of the exhaust system based on a flow rate of the exhaust gas. The injection control module adjusts the flow rate of the fuel based on the accumulation rate and the release rate.

16 Claims, 4 Drawing Sheets

EXHAUST HYDROCARBON INJECTION CONTROL SYSTEM AND METHOD

FIELD

The present disclosure relates to engine control systems and methods, and more particularly to control systems and methods that control delivery of fuel to adjust a temperature of a particulate filter.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Compression ignition engines, such as diesel engines, may produce particulate matter (PM) that is filtered from exhaust gas by a PM filter. The PM filter reduces emissions of PM generated during combustion. Over time, the PM filter becomes full and may restrict the flow of exhaust gas through the PM filter. PM that has collected within the PM filter may be removed by a process called regeneration. During regeneration, PM within the PM filter may be combusted.

Regeneration may be accomplished, for example, by increasing a temperature of the exhaust gas entering the PM filter. A hydrocarbon (HC) dosing unit may inject fuel into an exhaust system upstream from one or more exhaust components, such as an oxidation catalyst, and the PM filter. Most of the injected fuel mixes with the exhaust gas and combusts in the oxidation catalyst. The combustion heats the exhaust gas, thereby increasing the temperature of the exhaust gas entering the PM filter. A flow rate of the injected fuel controls the temperature of the exhaust gas to a regeneration temperature. The increased temperature of the exhaust gas may cause the PM to combust.

SUMMARY

A system comprises an injection control module and a fuel film module. The injection control module controls a flow rate of fuel injected into an exhaust system to adjust a temperature of exhaust gas. The fuel film module determines an accumulation rate of fuel on a surface of the exhaust system based on the flow rate of the fuel. The fuel film module determines a release rate of fuel from the surface of the exhaust system based on a flow rate of the exhaust gas. The injection control module adjusts the flow rate of the fuel based on the accumulation rate and the release rate.

In other features, the fuel film module determines the accumulation rate based on at least one of a temperature of the exhaust gas and a temperature of a component of the exhaust system. In still other features, the fuel film module determines the release rate based on at least one of a temperature of the exhaust gas and a temperature of a component of the exhaust system. The fuel film module determines a lost fuel rate of the fuel due to at least one of oxidation of fuel with the exhaust gas before entering an oxidation catalyst and fuel passing through the oxidation catalyst without combusting. The injection control module adjusts the flow rate of the fuel based on the lost fuel rate. In yet other features, the fuel film module determines a mass of fuel on the surface based on the accumulation rate and the release rate. The fuel film module limits the accumulation rate and the release rate based on the mass of fuel on the surface.

In other features, the surface of the exhaust system includes at least one an interior wall of an exhaust pipe and an inlet of a catalyst. The injection control module controls the flow rate of the fuel to heat the exhaust gas to a predetermined temperature. The injection control module controls the flow rate of the fuel to control the temperature of the exhaust gas to combust particulate matter (PM) in a PM filter. The injection control module controls at least one of an injection period of a fuel injector in the exhaust system and a speed of a fuel pump to control the flow rate of the fuel.

Further areas of applicability of the present disclosure will become apparent from the detailed description provided hereinafter. It should be understood that the detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

DETAILED DESCRIPTION

Figure 1:
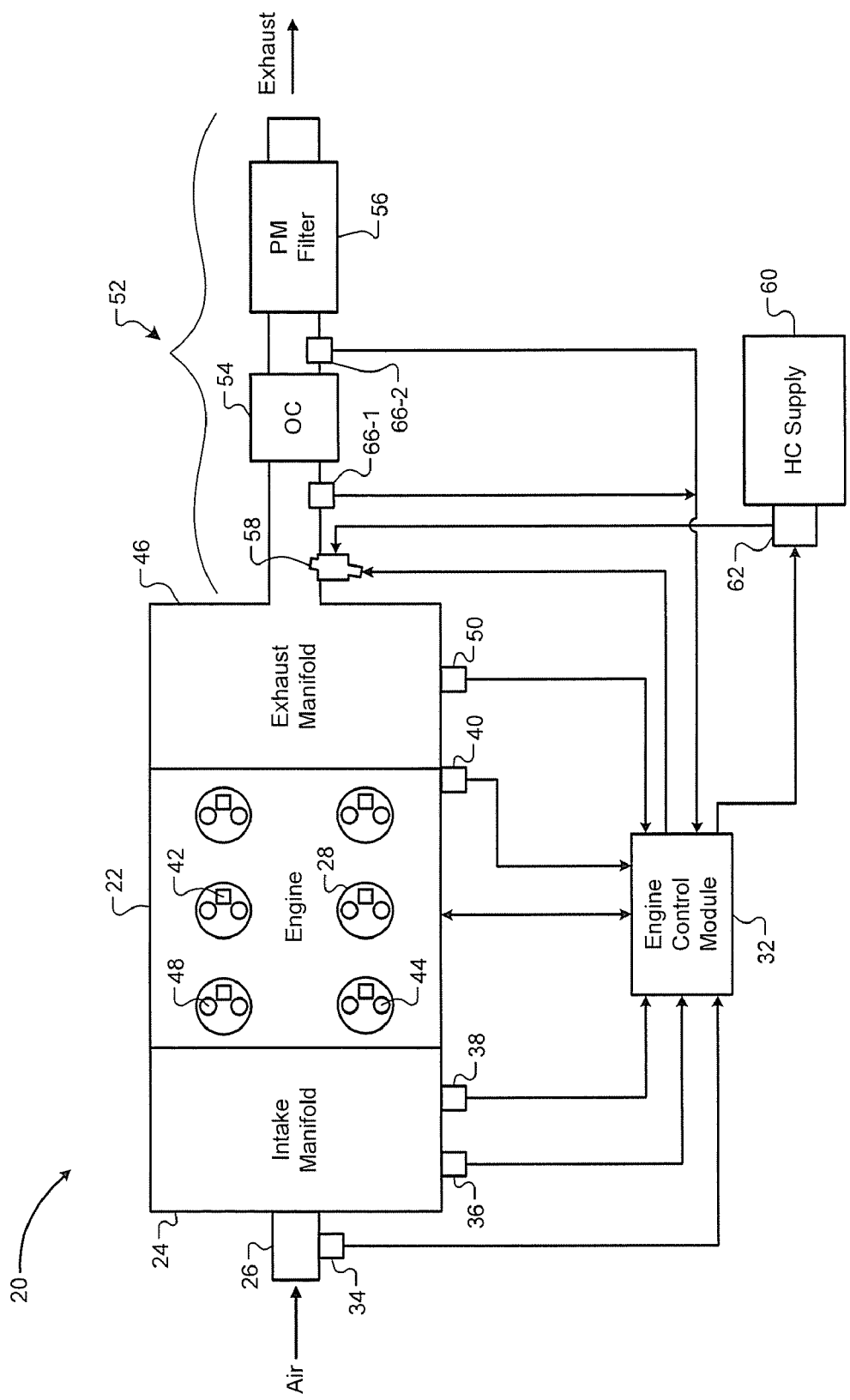
FIG. 1 is a functional block diagram of an exemplary engine system according to the present disclosure.

The following description is merely exemplary in nature and is in no way intended to limit the disclosure, its application, or uses. For purposes of clarity, the same reference numbers will be used in the drawings to identify similar elements. As used herein, the phrase at least one of A, B, and C should be construed to mean a logical (A or B or C), using a non-exclusive logical or. It should be understood that steps within a method may be executed in different order without altering the principles of the present disclosure.

As used herein, the term module refers to an Application Specific Integrated Circuit (ASIC), an electronic circuit, a processor (shared, dedicated, or group) and memory that execute one or more software or firmware programs, a combinational logic circuit, and/or other suitable components that provide the described functionality.

Typically, some of the injected fuel may not mix with the exhaust gas. Instead, some of the injected fuel may accumulate on a surface of the exhaust system, such as on an interior wall of an exhaust pipe and/or a surface of an exhaust component. Some of the accumulated fuel may be released into the exhaust gas by evaporation.

The accumulation and release of fuel may affect control of the temperature of the exhaust gas. For example only, when a portion of the injected fuel accumulates on the surface, that portion of fuel does not combust in the oxidation catalyst. The amount of fuel combusting in the oxidation catalyst decreases and may cause the temperature of the exhaust gas to decrease below the regeneration temperature. When a portion of fuel on the surface evaporates into the exhaust gas, that portion of fuel does combust in the oxidation catalyst. The amount of fuel combusting in the oxidation catalyst increases and may cause the temperature of the exhaust gas to increase above the regeneration temperature.

A control system and method of the present disclosure determines an accumulation rate of the fuel onto the surface of the exhaust system and a release rate of the fuel from the surface. The accumulation rate may be based on a flow rate of the injected fuel and a temperature of the exhaust gas near the HC dosing unit. The release rate may be based on a flow rate of the exhaust gas and the temperature of the exhaust gas near the HC dosing unit. The control system and method adjusts the flow rate of the injected fuel based on the accumulation rate and the release rate.

Referring now to FIG. 1, an exemplary engine system 20 is schematically illustrated in accordance with the present disclosure. The engine system 20 is merely exemplary in nature. The present disclosure may be applicable to engine systems that may include, but are not limited to, diesel engine systems, gasoline direct injection engine systems, and homogeneous charge compression ignition engine systems.

The engine system 20 includes an engine 22 that combusts an air/fuel mixture to produce drive torque. Air is drawn into an intake manifold 24 through an inlet 26. A throttle (not shown) may be included to regulate airflow into the intake manifold 24. Air within the intake manifold 24 is distributed into cylinders 28. Although FIG. 1 depicts six cylinders 28, the engine 22 may include additional or fewer cylinders 28. For example, engines having 4, 5, 8, 10, 12, and 16 cylinders are contemplated.

An engine control module (ECM) 32 communicates with components of the engine system 20. The components may include the engine 22, sensors, and actuators as discussed herein. Air passes through the inlet 26 through a mass airflow (MAF) sensor 34. The MAF sensor 34 generates a MAF signal that indicates a rate of air flowing through the MAF sensor 34. A manifold pressure (MAP) sensor 36 is positioned in the intake manifold 24 between the inlet 26 and the engine 22. The MAP sensor 36 generates a MAP signal that indicates air pressure in the intake manifold 24. An intake air temperature (IAT) sensor 38 located in the intake manifold 24 generates an IAT signal based on intake air temperature.

An engine crankshaft (not shown) rotates at engine speed or a rate that is proportional to engine speed. A crankshaft sensor 40 senses a position of the crankshaft and generates a crankshaft position (CPS) signal. The CPS signal may be related to the rotational speed of the crankshaft and cylinder events. For example only, the crankshaft sensor 40 may be a variable reluctance sensor. The engine speed and cylinder events may be sensed using other suitable methods.

The ECM 32 actuates fuel injectors 42 to inject fuel into the cylinders 28. An intake valve 44 selectively opens and closes to enable air to enter the cylinder 28. An intake camshaft (not shown) regulates the intake valve position. A piston (not shown) compresses and combusts the air/fuel mixture within the cylinder 28. The piston drives the crankshaft during a power stroke to produce drive torque. Exhaust gas resulting from the combustion within the cylinder 28 is forced out through an exhaust manifold 46 when an exhaust valve 48 is in an open position. An exhaust camshaft (not shown) regulates the exhaust valve position. An exhaust manifold pressure (EMP) sensor 50 generates an EMP signal that indicates exhaust manifold pressure.

An exhaust system 52 may treat the exhaust gas. The exhaust system 52 may include an oxidation catalyst (OC) 54. The OC 54 oxidizes carbon monoxide and hydrocarbons in the exhaust gas. The OC 54 oxidizes the exhaust gas based on the post combustion air/fuel ratio. The amount of oxidation may increase the temperature of the exhaust.

The exhaust system 52 includes a particulate matter (PM) filter 56. The PM filter 56 receives exhaust gas from the OC 54 and filters any PM present in the exhaust. A hydrocarbon (HC) dosing unit 58, such as a fuel injector, selectively injects fuel into the exhaust system 52 upstream from the OC 54 to control the temperature of the exhaust gas. An HC supply 60, such as a fuel tank, supplies fuel to the HC dosing unit 58 via a pump 62.

The ECM 32 controls the engine 22, the HC dosing unit 58, and the pump 62 based on various sensed and/or estimated information. The ECM 32 may use the HC dosing unit 58 to control a temperature of the exhaust gas input to the PM filter 56 to regenerate the PM filter 56. The ECM 32 may adjust a flow rate of fuel from the HC dosing unit 58 by controlling a speed of the pump 62 and/or an injection period of the HC dosing unit 58. The ECM 32 adjusts the flow rate of fuel injected by the HC dosing unit 58 according to the principles of the present disclosure.

The ECM 32 may estimate a PM filter load based on the sensed and estimated information. The filter load may correspond to an amount of PM in the PM filter 56. The filter load may be based on an exhaust temperature and/or a flow rate of the exhaust gas. The flow rate of the exhaust gas may be based on the MAF signal and fueling of the engine 22 determined by the ECM 32. When the filter load is greater than or equal to a filter load threshold, the ECM 32 may initiate regeneration. The ECM 32 may determine a desired OC outlet exhaust gas temperature (i.e., a predetermined temperature) to regenerate the PM filter 56.

The exhaust system 52 may include temperature sensors 66-1 and 66-2 (collectively temperature sensors 66). The temperature sensors 66 generate temperature signals that indicate temperatures of the exhaust gas and/or components of the exhaust system 52. For example only, the temperature sensors 66 may measure temperatures of the exhaust gas before the OC 54 and the PM filter 56. Temperature sensor 66-1 may measure an inlet exhaust gas temperature of the OC 54. Temperature sensor 66-2 may measure an inlet exhaust gas temperature of the PM filter 56 (i.e., an outlet exhaust gas temperature of the OC 54). Additional temperature sensors (not shown) may be disposed in other locations of the exhaust system 52. The ECM 32 may generate an exhaust temperature model to estimate exhaust temperatures throughout the exhaust system 52. The exhaust temperatures may be exhaust gas temperatures and/or temperatures of the exhaust system 52, such as wall temperatures and the like.

Figure 2:
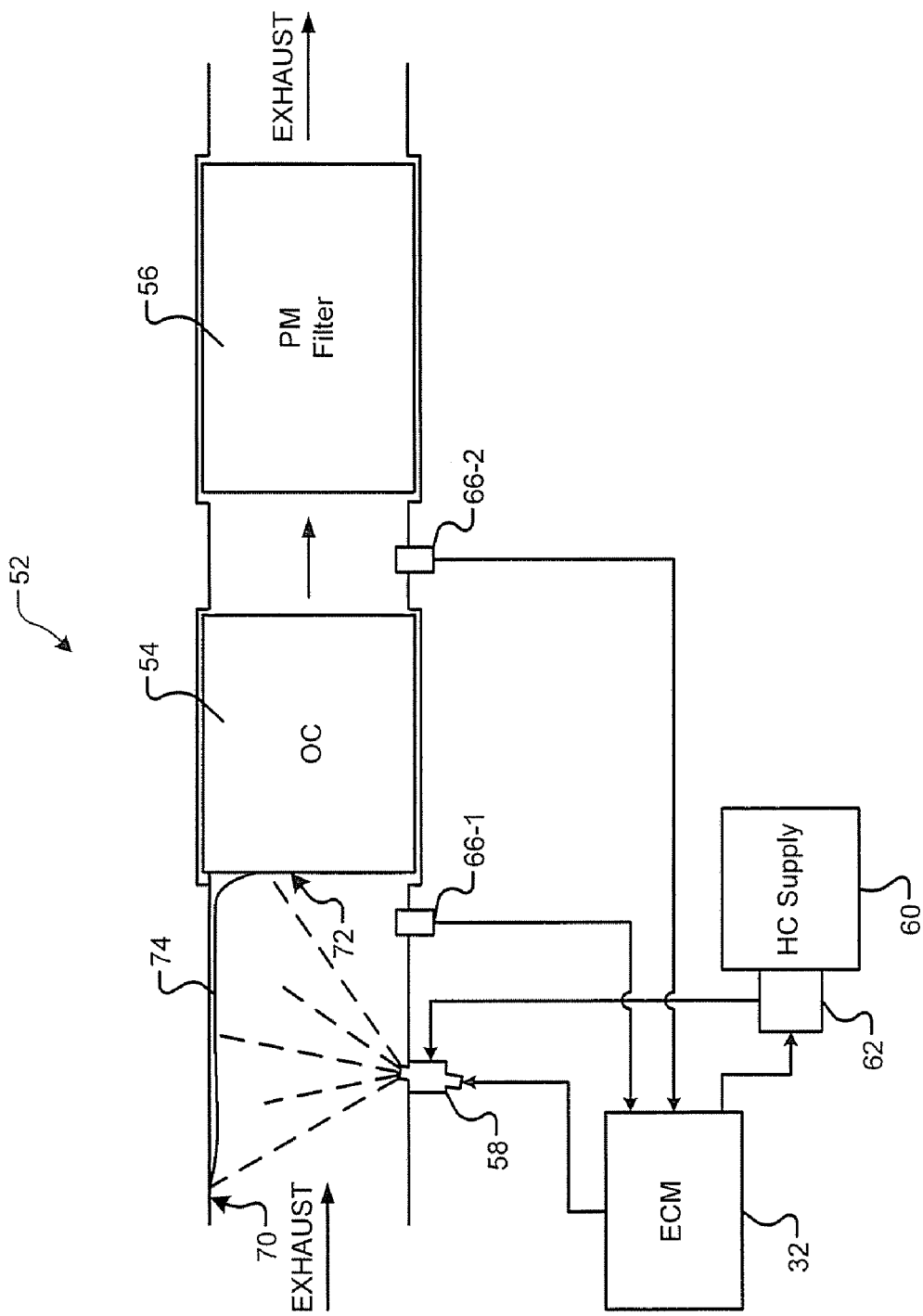
FIG. 2 is a functional block diagram of a hydrocarbon injection system of the present disclosure.

Referring now to FIG. 2, the HC dosing unit 58 injects fuel into the exhaust system 52 during regeneration of the PM filter 56. Most of the fuel mixes with the exhaust gas and combusts in the OC 54. The combustion increases the temperature of the exhaust gas input to the PM filter 56. Exhaust gas exiting the OC 54 is heated to a predetermined temperature to regenerate the PM filter 56. Temperature sensor 66-1 measures the inlet exhaust gas temperature of the OC 54 and temperature sensor 66-2 measures the outlet exhaust gas temperature of the OC 54 (i.e., the inlet exhaust gas temperature of the PM filter 56). The ECM 32 controls the flow rate of the fuel based on the desired outlet exhaust gas temperature of the OC 54.

Some of the injected fuel may not mix with the exhaust gas and may be deposited on an interior surface 70 of the exhaust system 52 and/or an inlet surface 72 of the OC 54. A fuel film 74 may form from the deposited fuel. Fuel may accumulate in the fuel film 74 and/or release (e.g., evaporate) from the fuel film 74 depending on conditions of the exhaust system 52 and the exhaust gas. For example only, fuel may be injected at a flow rate that causes some of the fuel to impinge on the surfaces 70 and 72 and accumulate into the fuel film 74. Fuel may evaporate from the fuel film 74 and thus, be released into the exhaust gas. The ECM 32 adjusts the flow rate of the fuel based on the accumulation of fuel in the fuel film 74 and the release of fuel from the fuel film 74.

Figure 3:
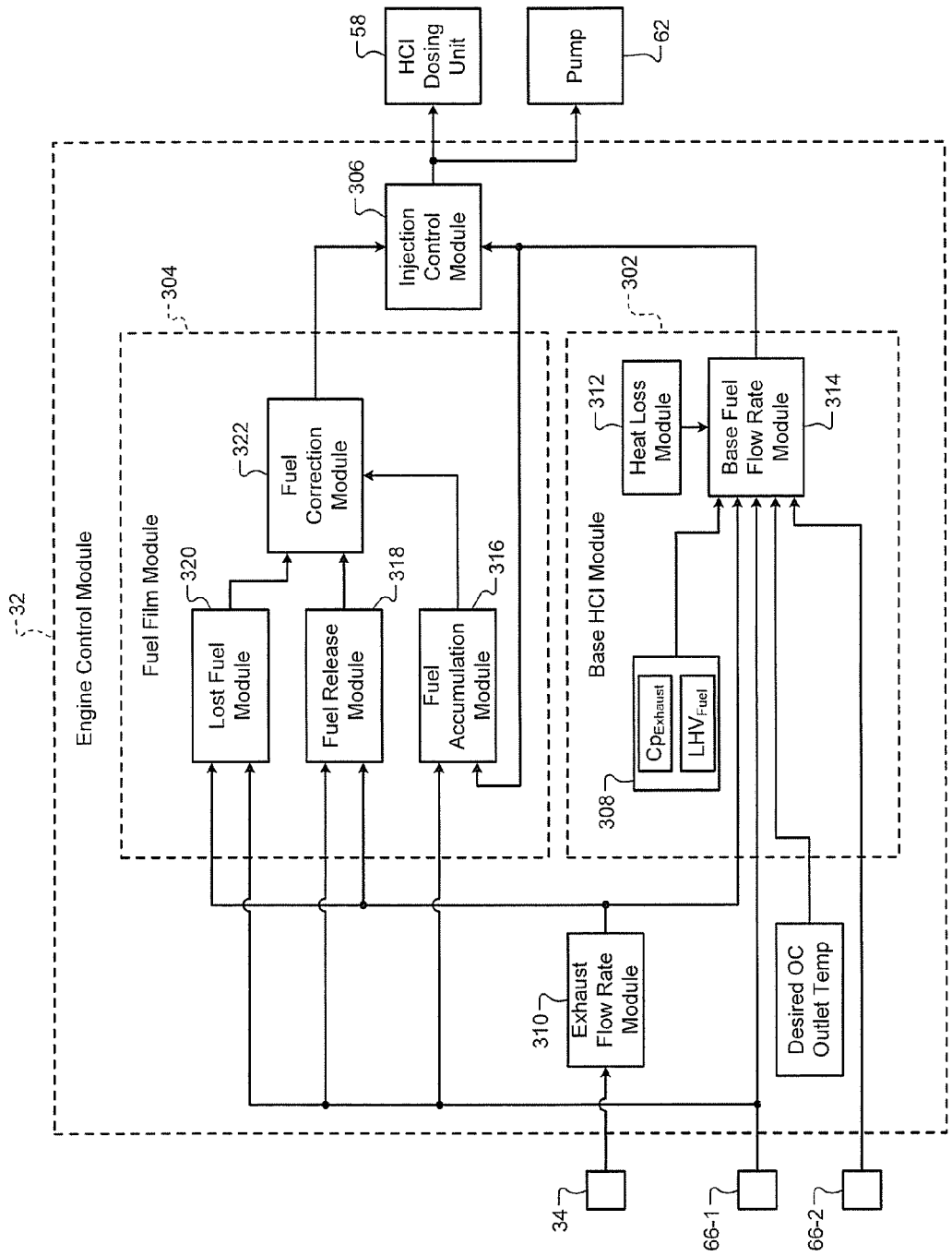
FIG. 3 is a functional block diagram of an exemplary implementation of an engine control module according to the present disclosure.

Referring now to FIG. 3, a functional block diagram of an exemplary implementation of the ECM 32 is shown. The ECM 32 may include a base hydrocarbon injection (HCI) module 302 that determines the flow rate of the fuel (kg/s) to control the temperature of the exhaust gas. The ECM 32 may include a fuel film module 304 that determines a correction value (kg/s) based on an accumulation rate and a release rate of fuel from the fuel film 74. The ECM 32 may include an injection control module 306 that adjusts the flow rate of the fuel based on the correction value. The ECM 32 may control operation of the HC dosing unit 58 and/or the pump 62 to deliver fuel at the flow rate to the exhaust system 52.

The base HCI module 302 may determine a base fuel flow rate to increase the temperature of the exhaust gas exiting the OC 54 to the desired outlet exhaust gas temperature of the OC 54 (i.e., the predetermined temperature.) The ECM 32 may determine the desired outlet exhaust gas temperature needed to regenerate the PM filter 56.

The base HCI module 302 may include memory 308 that stores a specific heat ($c_p$) of the exhaust gas and a lower heating value ($LHV_{fuel}$) of the fuel. The ECM 32 may include an exhaust flow rate module 310 that determines the flow rate of the exhaust gas based on the MAF and/or fueling of the engine 22. A heat loss module 312 may determine heat losses associated with cooling of the exhaust system 52 due to ambient air temperatures and vehicle speed. A base fuel flow rate module 314 may determine the base fuel flow rate of the HC dosing unit 58 based on the desired outlet exhaust gas temperature, the flow rate of the exhaust gas, the exhaust temperatures 66, inputs from memory 308, and the heat losses.

The fuel film module 304 determines the accumulation rate (kg/s) of fuel in the fuel film 74 and the release rate (kg/s) of fuel from the fuel film 74 and outputs the correction value. The fuel film module 304 includes a fuel accumulation module 316 that determines the accumulation rate of fuel in the fuel film 74 based on the flow rate of the fuel and the inlet exhaust gas temperature 66-1. The accumulation rate may be based on a look-up table or a predetermined map that outputs a percentage of the base fuel flow rate that accumulates in the fuel film 74 and that does not mix with the exhaust gas. The accumulation rate may be determined based on the percentage and the base fuel flow rate. For example only, when the flow rate of the fuel is 100 mg/s and the inlet exhaust gas temperature is 250° C., the look-up table may output a percentage of 10%. Therefore, the accumulation rate of fuel into the fuel film 74 is 10 mg/s.

The fuel film module 304 also includes a fuel release module 318 that determines a release rate of fuel from the fuel film 74 based on the flow rate of the exhaust gas and the inlet exhaust gas temperature 66-1. The release rate may be based on a look-up table or a predetermined map that outputs a rate at which fuel is released from the fuel film 74 and mixes with the exhaust gas. For example only, when the flow rate of the exhaust gas is 10 kg/s and the inlet exhaust gas temperature is 250° C., the look-up table may output a release rate of 1 mg/s.

The fuel film module 304 may also include a lost fuel module 320 that determines a loss rate of fuel from the fuel film 74 due to various other conditions of the exhaust system 52. For example only, the loss rate may be attributed to oxidation of fuel by the exhaust gas before the fuel and exhaust gas enter the OC 54. The loss rate may be due to fuel that passes through the OC 54 without combusting. The loss rate may be based on a look-up table or a predetermined map that outputs a rate at which fuel is lost. The loss rate may be based on the inlet exhaust gas temperature 66-1 and the flow rate of the exhaust gas.

A fuel correction module 322 may determine the correction value to correct the base fuel flow rate based on the accumulation rate, the release rate, and the loss rate of the fuel film. For example only, when fuel accumulates in the fuel film at the accumulation rate, the correction value may add fuel flow to the base fuel flow rate to compensate for the fuel flow that is lost to the fuel film 74. When the fuel releases from the fuel film at the release rate, the correction value may subtract fuel flow from the base fuel flow rate to compensate for the additional fuel flow added to the exhaust gas. The injection control module 306 may determine the predetermined injected fuel flow rate of the HC dosing unit 58 based on the base fuel flow rate and the correction value.

The fuel correction module 322 may also determine a mass of the fuel in the fuel film based on the accumulation rate, the release rate, and the loss rate. For example only, the exhaust system 52 may include a finite amount of surface area on which the fuel film 74 may accumulate. Therefore, a finite fuel mass may accumulate in the fuel film 74. The fuel correction module 322 may generate one or more fuel film limiting factors to limit the accumulation rate, the release rate, and the loss rate based on the mass of fuel in the fuel film 74 and the finite fuel mass. For example only, when the mass of fuel reaches the finite fuel mass, the film limiting factor may set the accumulation rate to zero because no more fuel may accumulate in the fuel film 74. Similarly, when the mass of fuel reaches zero, the film limiting factor may set the release rate to zero because no more fuel may be released by the fuel film 74.

Figure 4:
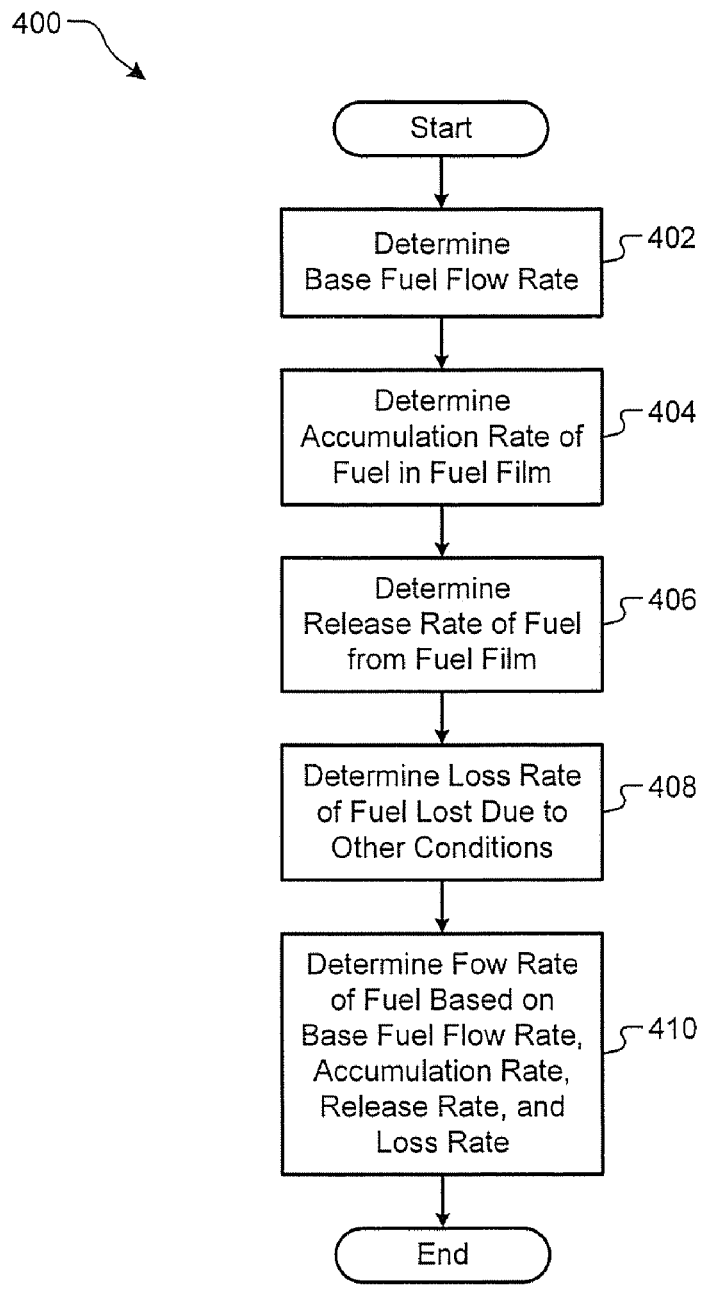
FIG. 4 is a flow diagram depicting an exemplary method performed by the engine control module according to the present disclosure.

Referring now to FIG. 4, a flowchart 400 depicts an exemplary method performed by the ECM 32. In step 402, control determines the base fuel flow rate to control the temperature of the exhaust gas. The base fuel flow rate may be a desired fuel flow rate to control the temperature of exhaust gas input to the PM filter 56 to the predetermined temperature. In step 404, control determines the accumulation rate of fuel in the fuel film 74. In step 406, control determines the release rate of fuel from the fuel film 74. In step 408, control determines the loss rate of fuel due to oxidation of fuel before fuel reaches the OC 54.

In step 410, control adjusts the flow rate of the fuel based on the base fuel flow rate, the accumulation rate, the release rate, and the loss rate. For example only, the flow rate of the fuel may be increased by increasing the base fuel flow rate based on the accumulation rate to compensate for fuel flow lost to the fuel film 74. The flow rate of the fuel may be decreased by decreasing the base fuel flow rate based on the release rate to compensate for fuel flow released by the fuel film 74. The flow rate of the fuel may be increased by increasing the base fuel flow rate based on the loss rate to compensate for fuel flow lost to oxidation before the OC 54.

Those skilled in the art can now appreciate from the foregoing description that the broad teachings of the disclosure can be implemented in a variety of forms. Therefore, while this disclosure includes particular examples, the true scope of the disclosure should not be so limited since other modifications will become apparent to the skilled practitioner upon a study of the drawings, the specification, and the following claims.

The invention claimed is:

1. A system comprising:
   an oxidation catalyst;
   an injection control module that controls a flow rate of fuel injected into an exhaust system at a location upstream from an oxidation catalyst to adjust a temperature of exhaust gas output by the oxidation catalyst; and
   a fuel film module that determines an accumulation rate of fuel on a surface of the exhaust system upstream from the oxidation catalyst based on the flow rate of the fuel and a temperature of the exhaust gas and that determines a release rate of fuel from the surface of the exhaust system upstream from the oxidation catalyst based on a flow rate of the exhaust gas and the temperature of the exhaust gas,
   wherein the injection control module adjusts the flow rate of the fuel based on the accumulation rate and the release rate to maintain the temperature of the exhaust gas output by the oxidation catalyst at a temperature greater than or equal to a predetermined temperature for regenerating a particulate matter filter downstream from the oxidation catalyst.

2. The system of claim 1, wherein the fuel film module determines a lost fuel rate of the fuel due to at least one of oxidation of fuel with the exhaust gas before entering an oxidation catalyst and fuel passing through the oxidation catalyst without combusting, wherein the injection control module adjusts the flow rate of the fuel based on the lost fuel rate.

3. The system of claim 1, wherein the fuel film module determines a mass of fuel on the surface based on the accumulation rate and the release rate.

4. The system of claim 3, wherein the fuel film module limits the accumulation rate and the release rate based on the mass of fuel on the surface.

5. The system of claim 1, wherein the surface of the exhaust system includes at least one an interior wall of an exhaust pipe and an inlet of the oxidation catalyst.

6. The system of claim 1, wherein the injection control module controls at least one of an injection period of a fuel injector in the exhaust system and a speed of a fuel pump to control the flow rate of the fuel.

7. A method comprising:
   controlling a flow rate of fuel injected into an exhaust system at a location upstream from an oxidation catalyst to adjust a temperature of exhaust gas output by the oxidation catalyst;
   determining an accumulation rate of fuel on a surface of the exhaust system upstream from the oxidation catalyst based on the flow rate of the fuel and a temperature of the exhaust gas;
   determining a release rate of fuel from the surface of the exhaust system upstream from the oxidation catalyst based on a flow rate of the exhaust gas and the temperature of the exhaust gas; and
   adjusting the flow rate of the fuel based on the accumulation rate and the release rate to maintain the temperature of the exhaust gas output by the oxidation catalyst at a temperature greater than a predetermined temperature for regenerating a particulate matter filter downstream from the oxidation catalyst.

8. The method of claim 7, further comprising:
   determining a lost fuel rate of the fuel due to at least one of oxidation of fuel with the exhaust gas before entering an oxidation catalyst and fuel passing through the oxidation catalyst without combusting; and
   adjusting the flow rate of the fuel based on the lost fuel rate.

9. The method of claim 7, further comprising determining a mass of fuel on the surface based on the accumulation rate and the release rate.

10. The method of claim 9, further comprising limiting the accumulation rate and the release rate based on the mass of fuel on the surface.

11. The method of claim 7, wherein the surface of the exhaust system includes at least one an interior wall of an exhaust pipe and an inlet of the oxidation catalyst.

12. The method of claim 7, further comprising controlling at least one of an injection period of a fuel injector in the exhaust system and a speed of a fuel pump to control the flow rate of the fuel.

13. The system of claim 2, further comprising a fuel correction module that determines a correction value based on the accumulation rate, the release rate, and the lost fuel rate.

14. The system of claim 13, wherein the injection control module adjusts the flow rate of the fuel by adjusting a base fuel flow rate based on the correction value.

15. The method of claim 8, further comprising determining a correction value based on the accumulation rate, the release rate, and the lost fuel rate.

16. The method of claim 15, wherein adjusting the flow rate of the fuel includes adjusting a base fuel flow rate based on the correction value.

* * * * *